United States Patent
DePaoli

(12)
(10) Patent No.: US 6,882,059 B1
(45) Date of Patent: Apr. 19, 2005

(54) VEHICAL WIND OPERATED GENERATOR

(76) Inventor: Michael DePaoli, 8275 E. Bell Rd. #3188, Scottsdale, AZ (US) 85260

( * ) Notice: Subject to any disclaimer, the term of this patent is extended or adjusted under 35 U.S.C. 154(b) by 161 days.

(21) Appl. No.: 10/424,674

(22) Filed: Apr. 28, 2003

(51) Int. Cl.[7] .................................................. F02D 9/00
(52) U.S. Cl. ............................ 290/44; 290/55; 180/165
(58) Field of Search .............................. 290/43, 44, 54, 290/55; 180/165, 65

(56) References Cited

U.S. PATENT DOCUMENTS

| | | | | |
|---|---|---|---|---|
| 3,556,239 A | * | 1/1971 | Spahn ........................ | 180/65.2 |
| 4,002,218 A | * | 1/1977 | Horvat ........................ | 180/2.2 |
| 5,280,827 A | * | 1/1994 | Taylor et al. ................ | 180/165 |
| 5,296,746 A | * | 3/1994 | Burkhardt .................... | 290/55 |
| 5,680,032 A | * | 10/1997 | Pena ........................... | 290/52 |
| 5,760,515 A | * | 6/1998 | Burns ......................... | 310/115 |
| 6,700,215 B1 | * | 3/2004 | Wu ............................. | 290/44 |

* cited by examiner

Primary Examiner—Nicholas Ponomarenko
(74) Attorney, Agent, or Firm—Parsons & Goltry; Robert A. Parsons; Michael W. Goltry

(57) ABSTRACT

Wind operated electrical generating apparatus includes a housing designed to be attached to the front of a vehicle and formed to extend substantially the length of the front of the vehicle for intercepting air flow produced by movement of the vehicle. The housing is further formed with an opening designed to direct intercepted air flow into a channel. A turbine is rotatably mounted within the housing in the channel for rotation of the turbine with air flow in the channel and an electrical generator is attached to the turbine for rotation with the turbine. The housing can be attached to the front bumper of a vehicle or be attached in lieu of the front bumper.

13 Claims, 2 Drawing Sheets

VEHICAL WIND OPERATED GENERATOR

FIELD OF THE INVENTION

This invention relates to electrical generating apparatus for powered vehicles.

More particularly, the present invention relates to electrical generating apparatus that is not operated by an engine of the powered vehicle.

BACKGROUND OF THE INVENTION

Powered vehicles, from completely electrical vehicles to internal combustion engines and combinations thereof, invariably require some form of electrical power. Generally this electrical power is supplied by rechargeable batteries that are carried on the vehicle. The problem is the batteries must be kept in a highly charged state. In the case of most vehicles with internal combustion engines, the engine not only is connected to the wheels to move the vehicle but is attached to a generator that continuously charges the battery as long as the engine is running. In the case of electric vehicles, generators are not practical because no rotary engine is available to run the generator. Because electric vehicles must run completely from the battery without benefit of onboard generators, the range of electrical vehicles is seriously limited. The limitation in range seriously limits the usefulness and, thus, the popularity of the electric vehicles. Also, many of the vehicles using internal combustion engines, and especially the combination vehicles, could benefit from additional electrical generating apparatus.

It would be highly advantageous, therefore, to remedy the foregoing and other deficiencies inherent in the prior art.

Accordingly, it is an object of the present invention to provide new and improved wind operated electrical generating apparatus for powered vehicles.

Another object of the present invention is to provide new and improved wind operated electrical generating apparatus for powered vehicles capable of continually generating electricity while the vehicle is moving.

And another object of the present invention is to provide new and improved wind operated electrical generating apparatus for powered vehicles capable of continuously generating electricity without significant negative impact.

Still another object of the present invention is to provide new and improved wind operated electrical generating apparatus for powered vehicles that can be applied to virtually any vehicle during or after manufacture.

SUMMARY OF THE INVENTION

The above problems and others are at least partially solved and the above purposes and others realized in new and improved wind operated electrical generating apparatus. The apparatus includes a housing designed to be attached to the front of a vehicle and formed to extend substantially the length of the front of the vehicle for intercepting air flow produced by movement of the vehicle. The housing is further formed with an opening designed to direct intercepted air flow into a channel. A turbine is rotatably mounted within the housing in the channel for rotation of the turbine with air flow in the channel and an electrical generator is attached to the turbine for rotation with the turbine. The housing can be attached to the front bumper of a vehicle or be attached in lieu of the front bumper.

The new and improved wind operated electrical generating apparatus for powered vehicles is capable of continually generating electricity while the vehicle is moving and continuously generates electricity without significant negative impact. Also, the new and improved wind operated electrical generating apparatus for powered vehicles can be applied to virtually any vehicle during or after manufacture. It is contemplated that the housing of the apparatus can be formed of strong polycarbonate or composite materials, or other suitable materials, so that it might withstand the impact of low speed crashes in lieu of or in addition to a normal bumper.

BRIEF DESCRIPTION OF THE DRAWINGS

The foregoing and further and more specific objects and advantages of the invention will become readily apparent to those skilled in the art from the following detailed description taken in conjunction with the drawings in which.

DETAILED DESCRIPTION OF A PREFERRED EMBODIMENT

Figure 1:
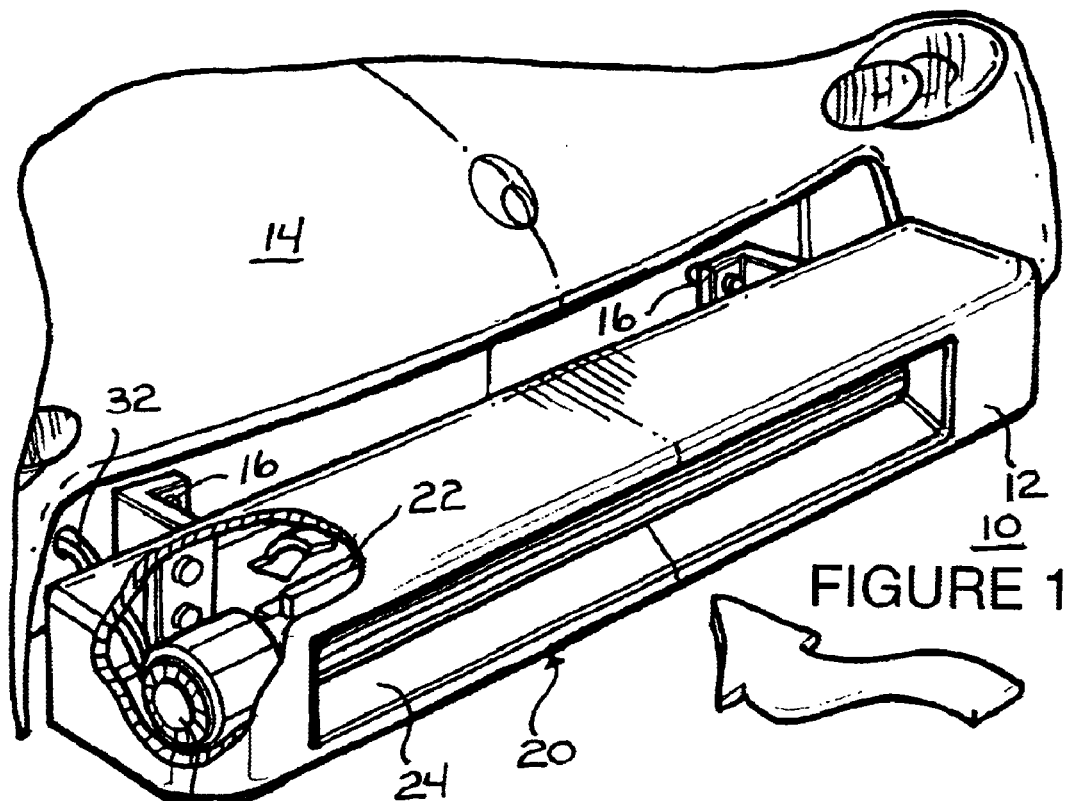
FIG. 1 is a view in perspective of wind operated electrical generating apparatus in accordance with the present invention, portions thereof broken away and shown in section.
Figure 2:
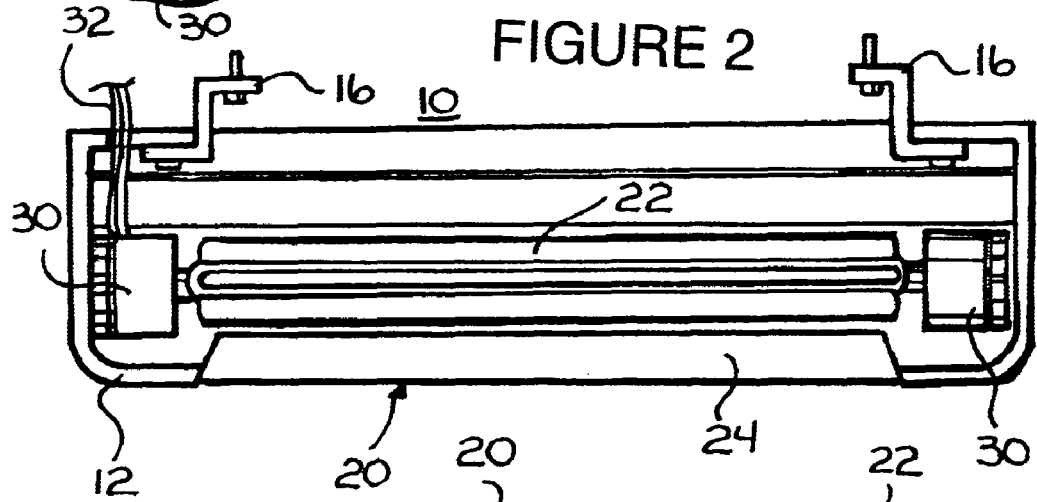
FIG. 2 is a view in top plan of the wind operated electrical generating apparatus of FIG. 1, with a top panel removed to better illustrate the internal components.
Figure 3:
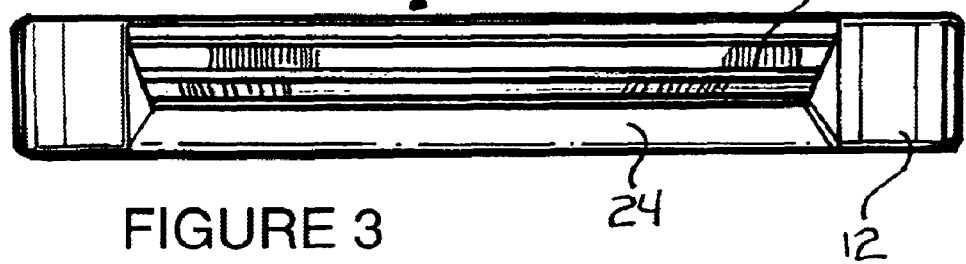
FIG. 3 is a front view of the wind operated electrical generating apparatus of FIG. 1.

Turning to the drawings, in which like reference characters indicate corresponding elements throughout the several views, attention is first directed to FIGS. 1, 2, and 3 which illustrate wind operated electrical generating apparatus 10 in accordance with the present invention. Apparatus 10 includes an elongated housing 12 attached to (or in lieu of) a bumper on the front of a vehicle 14. Housing 12, in this embodiment is provided with mounting brackets 16, which are used to affix apparatus 10 to the front bumper of vehicle 14. Apparatus 10 can be attached to vehicle 14 during manufacture or at any time after vehicle 14 has been manufactured. Also, apparatus 10 can be attached to the front bumper or can be provided in lieu of a front bumper, if constructed with sufficient ruggedness.

Here it should be noted that there is a requirement for all highway vehicles to have a front bumper to bear some of the brunt of a crash or other accident. The front bumper naturally has wind resistance as the vehicle moves. The wind resistance affecting the front bumper is a function of both the aerodynamics of its design and the volume of the air that is being displaced. Thus, no matter how aerodynamic a vehicle bumper might be, there is still going to be wind resistance because of the volume of air that must flow around the bumper as it slices through the air.

In this preferred embodiment, housing 12 is provided with an elongated opening 20 defined in the front surface and is specifically designed to direct the flow of most of the air encountered into opening 20. An elongated turbine 22 is rotatably mounted within housing 12 to receive air flowing into opening 20 in a direction to cause turbine 22 to rotate. For simplicity of understanding, turbine 22 is illustrated simply as an elongated paddle wheel with four paddles extending radially outwardly in each of the four quadrants. It will of course be understood that any of the various fan and blade configurations well known in the art could be utilized, including scoop shaped and the like.

Figures 4, 5:
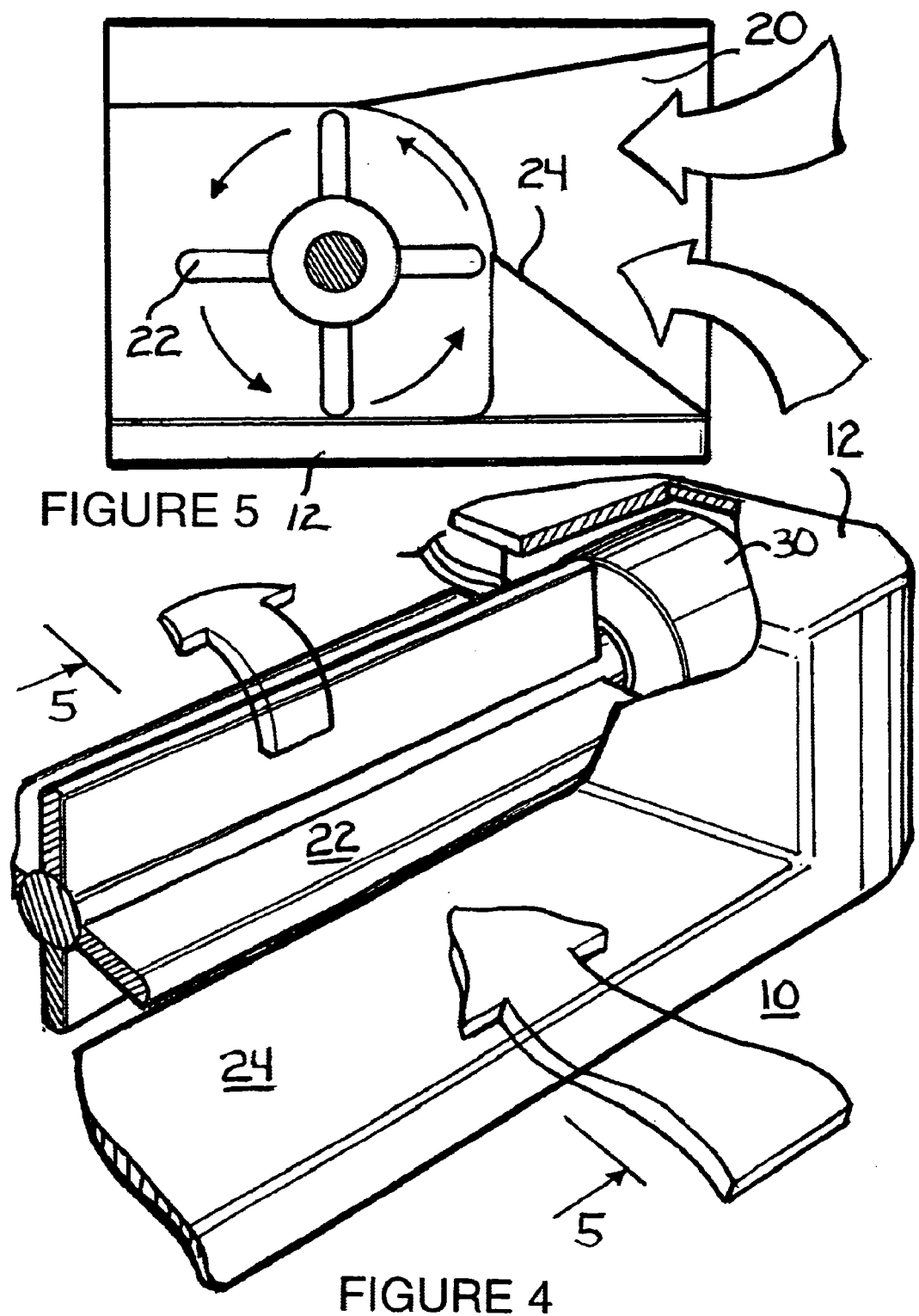
FIG. 4 is an enlarged view in perspective of the wind operated electrical generating apparatus of FIG. 1, portions thereof broken away and shown in section.
FIG. 5 is a sectional view as seen from the line 5—5 in FIG. 4.

As best seen in FIGS. 4 and 5, opening 20 is provided with a slanted or inclined surface 24 that directs incoming air onto one side or one half of turbine 22. By directing incoming air onto one side of turbine 22 impetus is provided for causing turbine 22 to spin or rotate in one direction. Thus, opening 20 and housing 12 are constructed to direct or channel incoming air onto one side of turbine 22 to produce rotary movement as vehicle 14 moves.

One or both ends of turbine 22 are attached to electrical generators 30. Here it should be understood that the term 'generator' is intended to include any of the well known electrical generating devices, such as generators, alternators, etc. In the present embodiment, each end of turbine 22 is rotatably mounted by attaching the ends to the rotors of a pair of electrical generators 30. The stators of electrical generators 30 are fixed to housing 12 and electrical output wires 32 for both generators 30 are connected into the electrical system of vehicle 14.

Thus, air flow produced by movement of vehicle 14 is directed onto turbine 22 by opening 20 and the shape of housing 12. This airflow causes rotation of turbine 22 which in turn rotates the rotor of generators 30 producing electricity. The electricity is carried by wires 32 to the electrical system of vehicle 14 and may be used, for example, to provide a continuous charge into batteries of vehicle 14, or to operate electric motors or lights. If vehicle 14 is an all electric vehicle, the additionally generated electricity will substantially extend the range. In any vehicle, much of the natural wind resistance of the front bumper is transformed into the generation of electrical power without having any significant negative impact on the aerodynamics of the vehicle.

Thus, new and improved wind operated electrical generating apparatus for powered vehicles has been disclosed. The new and improved wind operated electrical generating apparatus for powered vehicles is capable of continually generating electricity while the vehicle is moving and continuously generates electricity without significant negative impact. Also, the new and improved wind operated electrical generating apparatus for powered vehicles can be applied to virtually any vehicle during or after manufacture. It is contemplated that the housing of the apparatus can be formed of strong polycarbonate or composite materials, or other suitable materials, so that it might withstand the impact of low speed crashes in lieu of or in addition to a normal bumper.

The invention has been described above with reference to one or more preferred embodiments. However, those skilled in the art will recognize that changes and modifications may be made in the described embodiments without departing from the nature and scope of the invention. For instance, housing 12 and turbine 22 could be formed in a large variety of configurations. In a specific example, housing 12 is simply a blocking device such as a bar mounted in front of turbine 22 to partially block the airflow, directing or channeling the air flow over the turbine. Furthermore, while two generators are preferred, one can also be used and generators can also be connected by belts or the like as opposed to directly coupled to the turbine. In this case the opening defining a channel is simply a void over or under the blocking device.

Various changes and modifications to the embodiment herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. Wind operated electrical generating apparatus comprising:
   a housing designed to be attached to the front of a vehicle and formed to extend substantially the length of the front of the vehicle for intercepting air flow produced by movement of the vehicle, the housing being further formed with an opening designed to direct intercepted air flow into a channel;
   a turbine rotatably mounted within the housing in the channel for rotation of the turbine with air flow in the channel; and
   an electrical generator attached to the turbine for rotation with the turbine.

2. Wind operated electrical generating apparatus as claimed in claim 1 wherein the turbine includes an axle with a plurality of radially extending blades.

3. Wind operated electrical generating apparatus as claimed in claim 2 wherein the channel is elongated and extends horizontally approximately the length of the front of the vehicle.

4. Wind operated electrical generating apparatus as claimed in claim 3 wherein the plurality of radially extending blades of the turbine are elongated and extend horizontally approximately the length of the front of the vehicle.

5. Wind operated electrical generating apparatus as claimed in claim 1 wherein the electrical generator includes a rotor and a stator and the turbine is connected to the rotor.

6. Wind operated electrical generating apparatus as claimed in claim 5 including an electrical generator on each end of the axle of the turbine.

7. Wind operated electrical generating apparatus as claimed in claim 1 wherein the housing is constructed to attach to a front bumper of the vehicle.

8. Wind operated electrical generating apparatus as claimed in claim 1 wherein the housing is constructed to replace a front bumper of the vehicle.

9. Wind operated electrical generating apparatus as claimed in claim 1 wherein the plurality of radially extending blades of the turbine are elongated and extend horizontally less than the length of the front of the vehicle.

10. Wind operated electrical generating apparatus comprising:
    a housing designed to be attached to a front bumper of a powered vehicle and formed to extend substantially the length of the front bumper for intercepting air flow produced by movement of the powered vehicle, the housing being further formed with an opening designed to direct intercepted air flow into an elongated channel substantially the length of the front bumper;
    a turbine including an elongated axle with a plurality of radially extending blades rotatably mounted in the channel within the housing for rotation of the turbine with air flow in the channel, the blades having a length substantially equal to the length of the channel; and
    an electrical generator attached to the axle of the turbine for rotation with the turbine, an electrical output of the electrical generator being attachable to an electrical system of the powered vehicle.

11. Wind operated electrical generating apparatus as claimed in claim 10 wherein the electrical generator includes a rotor and a stator and the turbine is connected to the rotor.

12. Wind operated electrical generating apparatus as claimed in claim 11 including an electrical generator on each end of the axle of the turbine.

13. Wind operated electrical generating apparatus on a powered vehicle comprising:

a powered vehicle having a front end and an electrical system;

a housing attached to the front end of the vehicle and formed to extend a horizontal length equal to a horizontal length of the front end of the vehicle for intercepting air flow produced by movement of the vehicle, the housing being further formed with an opening designed to direct intercepted air flow into a channel, the channel having a horizontal length smaller than the horizontal length of the housing;

a turbine rotatably mounted within the housing in the channel for rotation of the turbine with air flow in the channel; and an electrical generator attached to the turbine for rotation with the turbine, the electrical generator having electrical output leads attached to the electrical system of the powered vehicle.

\* \* \* \* \*